(No Model.)  
2 Sheets—Sheet 1.
J. REICHMANN.
VALVE DEVICE.
No. 517,589. Patented Apr. 3, 1894.
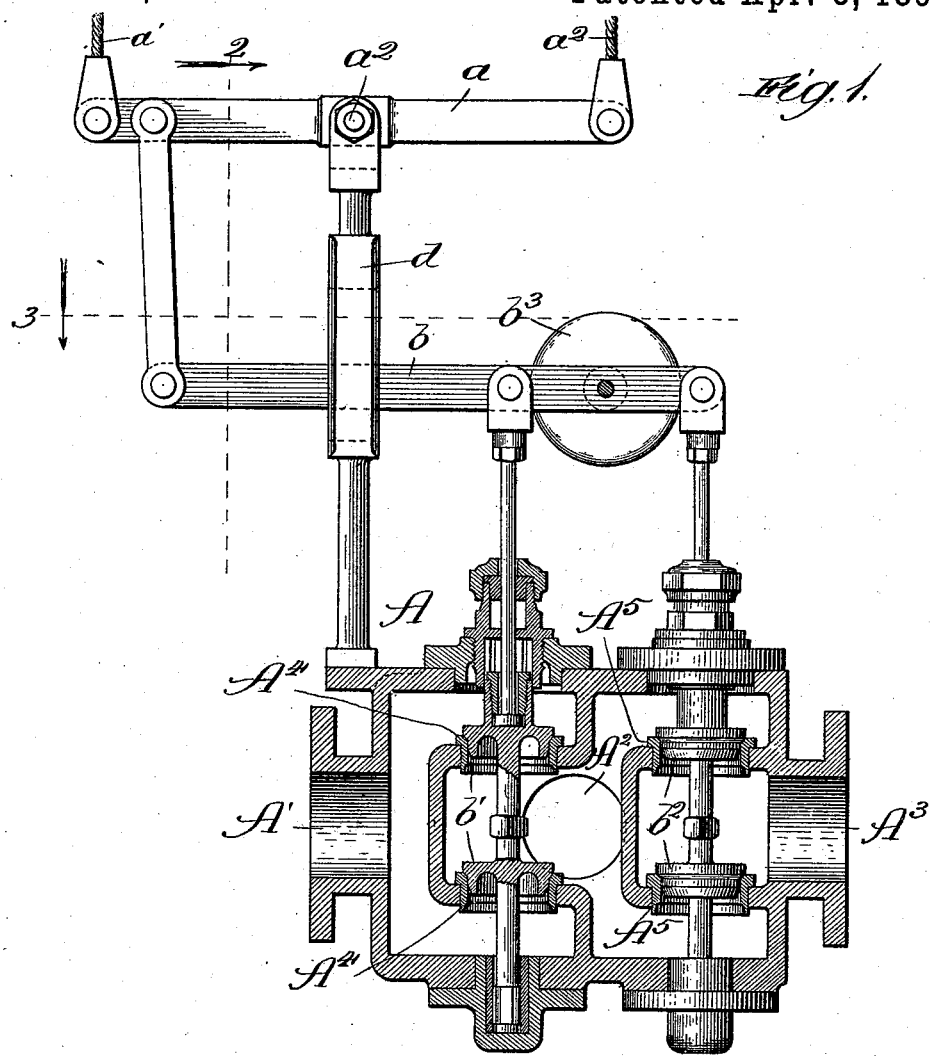
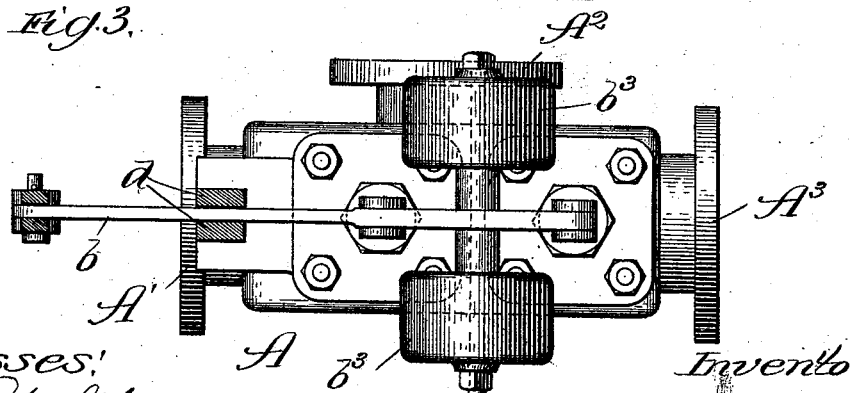
Witnesses:  
Chas. E. Gaylord  
Clifford N. White
Inventor,  
Joseph Reichmann  
By Dyrenforth & Dyrenforth  
Attys

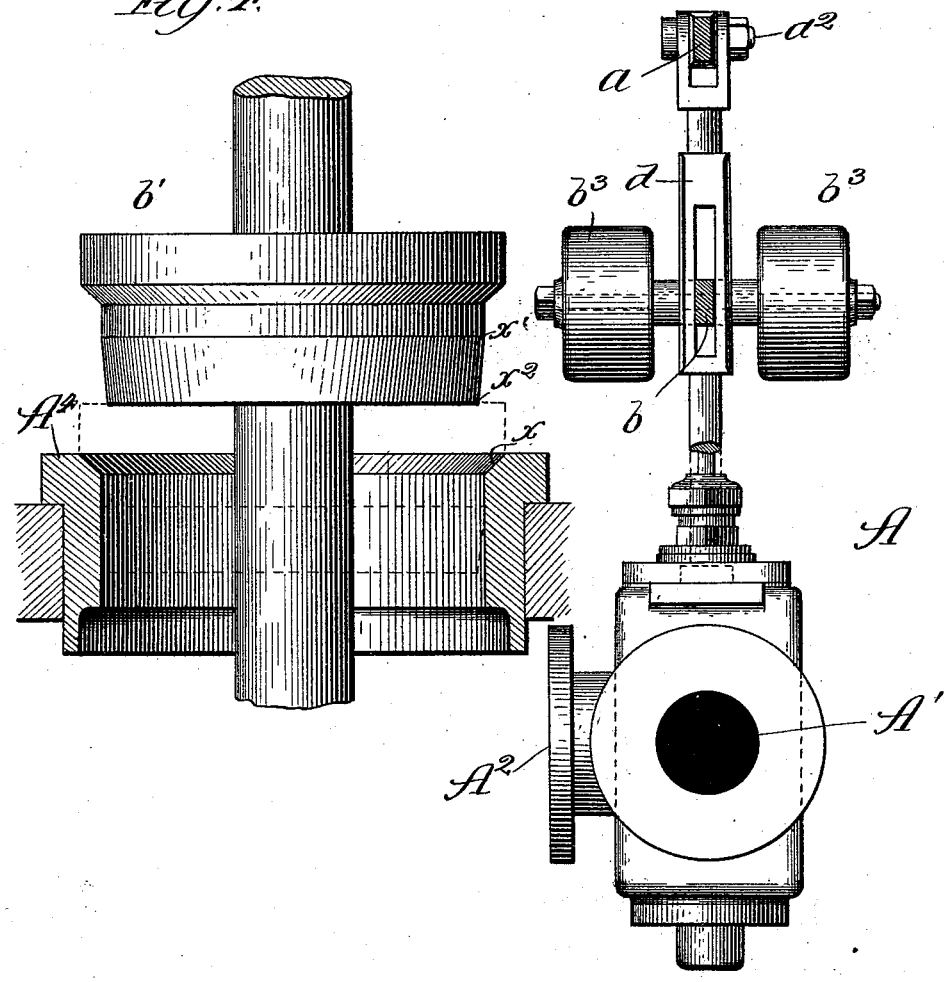

United States Patent Office.

JOSEPH REICHMANN, OF CHICAGO, ILLINOIS.

VALVE DEVICE.

SPECIFICATION forming part of Letters Patent No. 517,589, dated April 3, 1894.

Application filed March 20, 1893. Serial No. 466,834. (No model.)

*To all whom it may concern:*

Be it known that I, JOSEPH REICHMANN, a citizen of the United States, residing at Chicago, in the county of Cook and State of Illinois, have invented a new and useful Improvement in Valve Devices, of which the following is a specification.

My invention relates to an improvement in valve devices for controlling the flow of fluid under high pressure; and it has special relation to the valve set forth in Letters Patent of the United States, No. 300,131, granted to me on the 10th day of June, 1884.

The object of my present improvement is to render the operation of the valve and the control of the same more positive and less difficult for the operator and to render it practicable to operate the valve from a great distance as well as from a moving car.

My object is also to provide for securing an interval of time between the closing of one valve and the opening of the other, in order to bring to a positive and actual state of rest the apparatus to be controlled by the valve, such as the piston in a hydraulic elevator engine.

My further object is to provide a valve construction which admits of reducing to the minimum the valve area, whereby the surface of the valve-seat shall not be injuriously affected by the destructive tendency of the flow past it of fluid under high pressure; and to provide for securing tight closure of the valve against its seat, and to save the valve-chamber also from the destructive tendency referred to.

In the employment of a valve-device, of the class to which my improvement relates, in the hydraulic elevator referred to, it is necessary that the valves may be controlled by the operator from a great distance, as well as on a moving car, whereby a connection of great length between the operator and the valve is required, which will cause considerable friction, owing to its weight, and in which variation of temperature will produce change of its length.

The valve device as constructed in accordance with my aforesaid patent, whereby the action of the operator in one direction the open valve is seated and the valve formerly closed is opened, can be controlled by the operator when in close range of the valve, and is therefore not incumbered with a connection of great length, since a moderate amount of power must be exerted to overcome the overpressure of the valve to raise or remove it from its seats; and thereby it will give indication to the operator when the valve desired to be closed is seated and that by moving farther in the same direction the valve, which should remain closed, would be open. But as no perceptible time intervenes between the closing of the one valve and the opening of the valve formerly closed, since the resistance of the overpressure on the valve ceases almost at the instant the valve is raised from its seats, the strictest attention of a skilled operator is required for the successful control of the device. When the valve device is operated from any considerable distance, however, in attempting to close one valve, the other which it is desired to maintain closed is opened in spite of the skill and attention of the operator; and it is, therefore, difficult to bring the apparatus (piston) to be operated by the valve to a state of rest, owing to the unavoidable alternate opening and closing of the valves due to the absence of any indication to the operator of their position, except that of the overpressure on the valves transmitted by an incumbering connection and which overpressure ceases the instant, almost, that the valve is raised or removed from its seats. And this same overpressure is the only indication afforded the operator to guide him in the control of the valves which must be moved by him to a positive position to be seated and which are instantaneous in their action. To overcome these difficulties I provide the heads of the double-headed valves with pistons extending into and fitting the respective valve-seat openings, one of which is of larger and the other smaller area, whereby, when the valves are raised or removed from their seats, the fluid pressure of equal tension acting on the opposite ends of the valves, will serve to seat them automatically; and the pistons will serve as guards the instant the passage of the fluid is shut off, since the point of closure is not strictly confined to the seated position of the valves and is therefore easily found. The time of indicating the position of the valves is extended in proportion to the piston entering the valve-seat openings, so that the operator will have no difficulty in finding the seated position of the valves because, as soon as the pistons enter the valve-seat openings, the closing of the valves will have thereby been affected to a high degree, and all that is then required of the operator is to yield to the force of the fluid pressure exerted on the valve-piston, and the valves will be seated and automatically and effectively closed. This not only secures the positive seating of the valves to be closed, but it also prevents, temporarily, the opening of the formerly closed valve which it is desired to maintain closed; and if the operator should, from some cause, raise or move the latter from its seat, since a moderate amount of power must be exerted to overcome the overpressure on the valve, not only to unseat the same but also to remove the piston from the valve-seat openings, the pistons serving as guards will obstruct the passage of the fluid, thereby giving sufficient time and indication to the operator to yield to the overpressure on the valve and permit it to close automatically, whereby the difficulty of closing the valves from any desired point is avoided and the operator may control the opening of the same at will.

In the accompanying drawings—Figure 1 is a partly broken vertical sectional view of my improved valve and operating device. Fig. 2 is a section taken at the line 2 on Fig. 1 and viewed in the direction of the arrow, presenting an end view, and Fig. 3 presents a top plan view of the same. Fig. 4 is an enlarged broken sectional view showing a detailed construction of the valve.

A is the casing or shell of the valve-chamber having the induction and eduction openings $A'$ and $A^3$ for the ingress and discharge of the motive agent, and an opening $A^2$ at which to connect the chamber with the apparatus to be driven. The chamber A is subdivided by partitions, in which suitable openings are formed for the admission of the motive agent to, and to permit its expulsion through, the opening $A^2$; and these openings are controlled by double-headed valves $b'$, $b^2$, the openings, which are provided in the horizontal portions of the partitions, affording seats for the said valves. The stems of the valves $b'$ and $b^2$ pass through suitable stuffing-boxes and have, on their lower ends, flanges which enter the upper heads of the valves and are secured thereto by screw-caps. The valve-stems are pivotally connected at their upper ends with a lever $b$, toward one end thereof, the lever passing, toward its opposite end, through a forked or guiding standard $d$. The details thus far described are set forth in my aforesaid former patent.

I provide the seats for the double heads of the valves $b'$ and $b^2$ with detachable bushings $A^4$ and $A^5$, respectively; and besides the guides and usual seats referred to, I form each valve-head, or valve-proper, with a valve-piston which extends into the respective bushing or valve-seat when the valves are seated. These pistons are made cylindrical throughout a part of their length to fit the bushings closely all around. One piston is of a larger and the other is of a smaller area. By preference, the remainder of each piston should be conical, tapering slightly toward its extremity to afford a gradually increased opening, though it may be of V-shape, or by perforating it a gradually increasing opening may be provided. When the valve is raised from its seat the passage for the fluid remains closed until the cylindrical portion of the valve-pistons is entirely withdrawn and the seats of the valve-heads and those of the shell shall be a corresponding distance apart; and by withdrawing the reduced portion of the valve-pistons a gradual opening for the fluid is produced, which may be increased to the full capacity of the valve by raising it to the position shown in Fig. 4. The valves may be made entirely of metal forming one piece with the valve-pistons; and the valve-pistons and the seating portion of the valve-heads may be made adjustable and detachable, with the heads formed of rubber and the detachable bushings of suitable metal. A lever $a$ is pivotally supported at its center on the upper end of the standard $d$, being linked near one end, as shown in Fig. 1, to the adjacent end of the lever $b$. From opposite ends of the lever $a$ extend, in a well-known manner, cable-ends $a'$ and $a^2$ to the position of an operator, which may be at any desired distance from the valve or on the moving car of an elevator (not shown) where the operator may control the valves $b'$ and $b^2$ by a pulling strain exerted on one end of the cable, thereby permitting the other end to yield and thus produce movement of the lever $a$ from its normally horizontal position and with it that of the lever $b$. In this manner, depending on the direction of tipping the lever $a$, one or the other of the double-headed valves $b'$ or $b^2$ may be opened or closed at will, the connection of the lever $b$ with the valve-stems rendering one of the latter the fulcrum for the lever in raising the other in the manner stated. To the lever $b$ is attached between the stems of the valves $b'$ and $b^2$, a weight $b^3$, which, should the cable $a'$, $a^2$ break while either one of the valves is raised, will serve to force the levers $a$, $b$ to their horizontal positions and thereby produce closure of the valve to stop the motion of the apparatus being operated. The valve may be operated directly by the lever $b$ when the operator is near the reach of the same; and the lever $a$ and connections may then be omitted.

The operation is as follows: The fluid under pressure admitted into the chamber A at $A'$ has free access to the opposite ends of the valve $b'$; and owing to the different areas of the two valve-heads the fluid pressure of equal tension will produce an overpressure on the valve relative to the difference of area. By a pulling strain exerted on the cable-end $a'$ to raise the levers $a$ and $b$ and with them the double-headed valve $b'$ from its seat $A^4$, a moderate amount of power must be exerted to overcome the resistance of the overpressure referred to; but when the valve is raised from its seat, the valve-pistons extend into the valve-openings being also of different areas, the resistance of the valve is maintained and the fluid pressure of equal tension acting in opposite directions on the valve-pistons, will cause an overpressure relative to the area of the larger and smaller valve-pistons, until the valve-pistons are sufficiently withdrawn from the valve-seats $A^4$. Thus the period of resistance which has to be overcome, on the valve, is extended sufficiently to indicate to the operator the position of the valve, by causing a prolonged resisting strain on the cable $a'$. An interval of time elapses between the unseating and the opening of the valve, owing to the valve-pistons maintaining the valve-openings closed until the pistons have been sufficiently withdrawn and the valve-heads $b'$ have been removed to a corresponding distance from the seats $A^4$, when the passage for the fluids is opened. As the straight portions of the two valve-pistons are withdrawn gradual opening of the valve is produced by the withdrawal of the tapering portions and the fluid admitted at $A'$ will pass through the valve-openings $A^4$ to the passage $A^2$ and to the apparatus to be operated, thereby inducing a slight motion to the same (piston of the elevator engine referred to) which motion may be increased to the full speed by raising the valve clear of its seats or to the relative position represented in Fig. 4. When it is desired to stop the motion of said piston, a pulling strain exerted on the cable end $a^2$ will move the valve toward its seated position, but when the two valve pistons enter the openings $A^4$, the fluid pressure of equal tension, acting on them in opposite directions will, owing to the increased area, of the upper valve piston, exert its force to move the valve toward its seats, indicating thereby to the operator the position of the valve by causing a pulling strain on the cable $a'$ and seating the valve automatically, if permitted by the operator, by his yielding to the force of the fluid-pressure exerted on the valve-piston of the greater area. When motion is desired of the piston of the elevator engine in the opposite direction, a pulling strain is again exerted on the cable-end $a^2$ to open the valve $b^2$ and cause the fluid from the said apparatus to exhaust by way of the passage $A^2$ through the outlet $A^3$. This fluid has free access to the opposite ends of the valve $b^2$ and the fluid-pressure will exert its force on that valve in opposite directions, whereby, owing to the different areas of the two valve-heads the raising of the valve will be resisted by the over-pressure on the upper head. This resistance must be overcome to raise the valve from its seat.

The valve-pistons, extending into the valve-openings, still maintain the passages closed, and the fluid-pressure acting on the valve-pistons, which are also of different areas, will maintain the resistance until both the pistons have been withdrawn from the valve-seat openings; when, by withdrawing the tapering portions of the valve pistons, gradual communication between the passages $A^2$ and $A^3$ is produced by means of the valve-openings $A^5$, thereby, inducing a slow motion of the said elevator engine piston, which may be increased at will to full speed. When it is desired to reverse the motion of the piston, in case the valve $b'$ is opened, a pulling strain is exerted on the cable-end $a^2$ to bring the levers $a$ and $b$ to their normal horizontal positions and the valve $b'$ is closed in the manner stated. By continuing to move the cable-end $a^2$ in the same direction, the levers $a$ and $b$ will be shifted from their normal positions and the valve $b^2$ will be opened, thereby causing the motion of the piston (of the elevator engine) to be reversed. As a sufficient interval of time elapses between the closing of the one valve and the opening of the other, the motion of said piston is arrested and its reverse motion is effected without causing shock or jar; and the operator may close the valve formerly opened and open the valve for reversing the motion of the piston, by continuous movement in the same direction. By procuring the condition necessary for the control of the device by causing the interval of time between the closing and opening of the two valves $b'$ and $b^2$, respectively, the prolonged resistance in opening the valve and the power to seat the valve automatically by the fluid-pressure of equal tension acting on the opposite ends thereof, the seats of the valve-heads are removed a corresponding distance from those of the shell before a passage for the fluid is opened. Thus when the valve-heads are raised from the seats, the passage for the fluid remains closed until the straight or cylindrical portion of the valve-piston has been entirely withdrawn, when there will be sufficient space between the valve-heads and the seats attached to the shell to permit free passage of the fluid around the heads or valves; but as the straight portion of the valve-piston is withdrawn, an opening will be produced and the flow of the fluid will be confined within the boundaries defined by the point $x$ (Fig. 4) of the valve-seat and the points $x'$ and $x^2$ of the valve-piston and will wear only the inner surface of the pushing and the outer surface of the valve-piston, which will also be the effect when the valve is fully open, as represented in Fig. 4. In that position the flow of the fluid is confined within the boundaries defined by the point $x$ of the valve-seat and the point $x^2$ of the valve-piston, since the point $x$ being the nearest approachable point of the valve-seat surface, the largest possible volume of fluid will be admitted with a valve of only sufficient additional area to cover the seat, whereby the largest possible volume of fluid may be controlled and the area reduced to the minimum. Thus a velocity of the flow of the fluid is transmitted to the exterior surface between the points $x'$ and $x^2$ of the valve piston and the interior surface of the valve-seat at $x$, which forms the internal extremity of the axial valve-seat surface, as the narrower passage is there formed. Hence the velocity of the flow of the fluid will produce cutting of the material of those parts, while the valve-seat proper will be uninjured and the valves will remain capable of tight closure.

By the foregoing construction one of the objects of my invention is attained, namely, tight closure of the valve with the minimum of valve area. The all important advantage of this consists in transferring the flow of fluid from the valve-seat by means of the valve-piston directly and immediately to the nearest approachable point of the valve-seat surface, whereby, while the velocity of the flow of the fluid is checked in passing the valve-seat surface to maintain tight closure of the valve, the largest possible passage of the fluid is afforded, so that the largest volume of fluid may be controlled with the relatively smallest valve, for the over pressure on the valve is thereby avoided and easy control of the valve is rendered possible—a most essential requirement for the proper performance of its function. Besides, a valve of any desired size may be operated; while with overpressure on the valve, its scope of usefulness is limited in the same degree, owing to the resistance in its operation. As, by the velocity of the flow of the fluid, the cutting of the valve-seats $A^4$ and $A^5$ is in a radial direction, thereby increasing the size of the valve-openings, leakage will be caused between the inner surface of the valve-seats and the outer surface of the valve-pistons when the valve is raised from its seat, and the cutting will reduce the valve-seat surface. When the valve-seats are worn to an extent that impairs the efficiency of the device, they may be removed and the efficiency of the device will be restored by renewing them.

What I claim as new, and desire to secure by Letters Patent, is—

1. In a valve-device, the combination with the shell having the passages $A'$, $A^2$ and $A^3$ and valve-seats $A^4$ and $A^5$, of the lever $b$ and the double-headed valves $b'$ and $b^2$, each provided with the relatively larger and smaller valve-pistons, the valves being pivotally connected with said lever to form, each, when seated, the fulcrum of the lever for unseating the other, substantially as and for the purpose set forth.

2. In a valve-device, the combination with the shell having the passages $A'$, $A^2$ and $A^3$ and valve-seats $A^4$ and $A^5$, of the lever $b$ and the double-headed valves $b'$ and $b^2$, each provided with the downward-tapering, relatively larger and smaller, valve-pistons, the valves being pivotally connected with said lever to form, each, when seated, the fulcrum of the lever for unseating the other, substantially as and for the purpose set forth.

JOSEPH REICHMANN.

In presence of—
M. J. FROST,
W. N. WILLIAMS.